April 27, 1965 G. L. MOHNKERN 3,181,059

OPTICAL POLARITY INDICATOR FOR MAGNETICALLY RECORDED SIGNALS

Filed Oct. 2, 1961

Gerald L. Mohnkern
*INVENTOR.*

*BY* S. J. Rotondi
A. T. Dupont
Julian H. Dority

United States Patent Office 3,181,059

Patented Apr. 27, 1965

3,181,059
OPTICAL POLARITY INDICATOR FOR MAGNETICALLY RECORDED SIGNALS

Gerald L. Mohnkern, Las Cruces, N. Mex., assignor to the United States of America as represented by the Secretary of the Army Filed Oct. 2, 1961, Ser. No. 142,442
1 Claim. (Cl. 324—38)
(Granted under Title 35, U.S. Code (1952), sec. 266)

The invention described herein may be manufactured and used by or for the Government for governmental purposes without the payment of any royalty thereon.

This invention relates generally to a device for visually observing data recorded on magnetic medium, and more particularly to a device for observing the polarity of magnetically recorded data.

The problem in the past has been to determine the polarity of the bits of information stored on a magnetic tape visually and this invention provides a simple method for visually determining the polarity of the bits without damaging the tape or destroying the information stored on the tape. Bits of magnetic material have long been used to store binary information on magnetic tapes. A bit is similar to a bar magnet since it has both a north and south pole. Depending on the direction of the north and south pole a binary "1" or a binary "0" is stored on a tape.

In the ordinary usage of magnetic recording media, such as tape or disc, it is desirable, and often necessary, to check for proper recording. It then becomes desirable to provide means whereby the information on the magnetic media can be visually observed and the polarity of the bits of information stored on said media can be determined visually.

In present practice, where recorded data on a magnetic media, such as magnetic tape, is to be examined visually, it is dipped in a suspension of fine magnetic particles which when allowed to dry forms a display of the recorded data configuration. However, magnetically recorded tape which has been dipped in such a solution of powered magnetic particles must be thoroughly cleaned before its further use in playback equipment is feasible or else loss of information may occur due to pile up of excess particles on the head of the playback equipment. Also, there is no way to determine from the display the polarity of the bits of information stored on the tape.

It is, therefore, one of the objects of this invention to provide a device which will convert data recorded on a magnetic media into optically visible traces and which will be of such size as to be readily portable and which can provide a viewing surface of sufficient size to quickly and accurately ascertain the polarity of bits of information on the magnetic media.

Another object of this invention is to provide a magnetic optic converter which will almost instantly produce a suitable visual display of the recorded magnetic bits of information on a magnetic media, such as magnetic tape, without subjecting the media to direct contact with a solution of magnetic particles or dry magnetic particles.

Another object of this invention is to provide a device which will visually determine the polarity of bits of information stored on a magnetic media.

The foregoing and other objects of this invention will become more fully apparent from the following detailed description of the invention and from the accompanying drawings in which.

Figure 1:
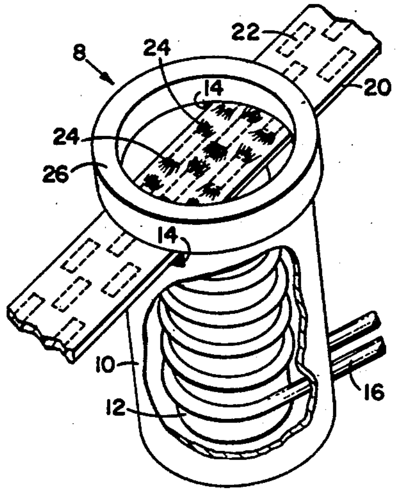
FIGURE 1 is a pictorial view of the polarity indicator of this invention showing a cut away section.

In the drawing, for purpose of illustration there is shown a preferred embodiment of the invention for visually determining the polarity of magnetically recorded data. The optical device (FIGURE 1) embodying the invention, generally indicated at 8, comprises an electromagnet 12, a plurality of bits of information 22, and a viewer or display means 26 disposed above the bits of information.

The electromagnet 12 is enclosed in a housing 10 having a slot 14 opening through opposite sides thereof adjacent its top and through which a magnetic tape 20 can pass. A plurality of bits of information 22 are shown on the tape. These bits are not visible to the naked eye and are represented by dotted lines so as to aid in explaining the invention. The size of the bits of information is also enlarged for purposes of illustration. Mounted above the tape 20 is a viewer or display means 26.

Figure 6:
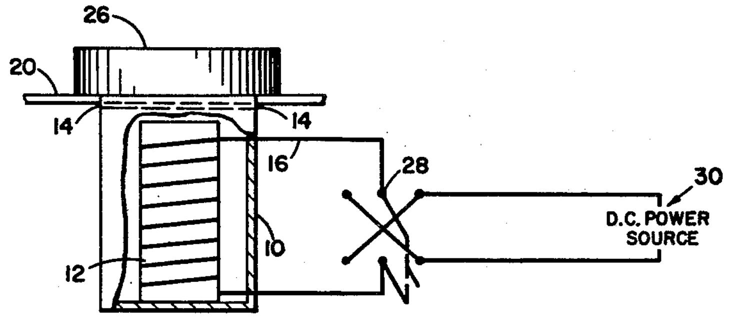
FIGURE 6 is a diagrammatic view of the invention.
Figure 5:
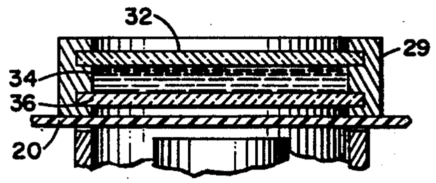
FIGURE 5 is a cross sectional view of the viewer taken along line 5—5 of FIGURE 4.

The viewer 26 encloses a liquid 34 (FIGURE 5) in which ferromagnetic particles such as metal filings 24 are held in suspension. The liquid 34 is contained in the viewer between two spaced glass plates 32 and 36. The two glass plates are sealed within an outer frame 29. FIGURE 6 shows the power supply 30 for the electromagnet and a double pole double throw switch 28 connected between the power source and the winding 16 of the electromagnet.

Figures 2, 3, 4:
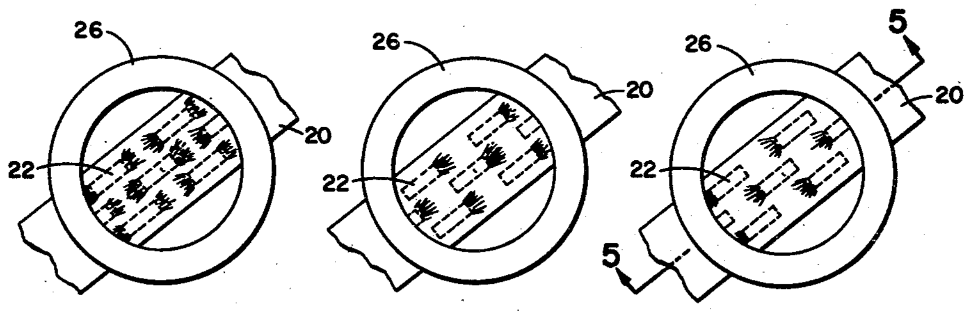
FIGURE 2 is a plan view of the viewer in use with a magnetic tape showing the filings and bits when there is no magnetic field applied.
FIGURE 3 is a plan view similar to FIGURE 2 but showing the filings and bits when there is a magnetic field of one polarity applied.
FIGURE 4 is a plan view similar to FIGURE 2 showing the filings and bits when there is a magnetic field of a second polarity applied.

The operation of the device is such that when the electromagnet 12 is not energized the metal filing 24 within the viewer will collect above both ends of the bits of information as shown in FIGURE 2. However, when the switch 28 is closed in one direction the electromagnet will be energized. The energization of the electromagnet will produce a magnetic field perpendicular to the tape 20. This magnetic field will completely or partially cancel the magnetic field produced by one pole of a bit and add to the magentic field of the other pole of the bit. Therefore, if the magnitude of the external field produced by the electromagnet is made equal to the perpendicular component of the field at the ends of the bits, the fields will cancel and no particles will gather at one end of the bit, however at the other end of the bit the fields add, and result in an intensified display of particles. By reversing the switch 28 the polarity of the magnetic field produced by the electromagnet will reverse which will result in a display of metal particles or filings at the opposite end of the bits as shown in FIGURE 4 so that the polarity of the bits can be determined.

One embodiment of the invention uses an electromagnet consisting of 90 turns of number twenty wire on a 1¼ inch iron core and a satisfactory display was obtained using a current of 120 milliamperes. The flux density was calculated to be 165 oersted, which produces a residual magnetism in the tape of less than 3% of the normal digital recording level.

This invention is not limited to use with magnetic tapes and can be used in any device in which the polarity of bits of magnetic information is to be determined visually. The low intensity field generated by the electromagnet produces only negligible noise on the tape, and requires very little equipment, while providing excellent visual contrast between poles.

What is claimed is:

An optical device for visually determining the polarity of magnetically recorded data comprising: an electromagnet; a reversible D.C. power supply connected to said electromagnet; a magnetic tape disposed above said electromagnet so that the magnetic field produced by said electromagnet will be perpendicular to the tape; a pluraliy of bits of information having first and second magnetc poles stored on said tape; a viewer positioned above said magnetic tape and directly over said electromagnet, a liquid which is light transmissive enclosed in said viewer, and particles of metal, which are subject to influence of a magnetic field, suspended in said liquid whereby the particles will collect over said first or second pole of said bit in response to the polarity of said magnetic field.

References Cited by the Examiner

UNITED STATES PATENTS

| | | | |
|---|---|---|---|
| 2,436,829 | 3/48 | Roth | 324—34 |
| 2,447,899 | 8/48 | Coon | 324—38 |
| 2,530,564 | 11/50 | Blaney | 324—38 |
| 3,013,206 | 12/61 | Youngquist et al. | 324—38 |

OTHER REFERENCES

Cooter: "External Magnetic Field Patterns Surrounding Minute Portions of Recording Wires," AIEE Miscellaneous Paper, Aug. 31, 1948.

WALTER L. CARLSON, *Primary Examiner.*

FREDERICK M. STRADER, *Examiner.*